US008340123B2

(12) United States Patent
Barbieri et al.

(10) Patent No.: US 8,340,123 B2
(45) Date of Patent: Dec. 25, 2012

(54) MULTI-CHANNEL TRANSCEIVER MODULE CARD

(75) Inventors: Alessandro Barbieri, Santa Clara, CA (US); Adam Jonathan Carter, San Jose, CA (US); David C. Lai, Mountain View, CA (US); Thomas Scheibe, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 12/471,138

(22) Filed: May 22, 2009

(65) Prior Publication Data

US 2010/0296559 A1 Nov. 25, 2010

(51) Int. Cl.
*H04J 3/16* (2006.01)

(52) U.S. Cl. ....................................................... 370/466

(58) Field of Classification Search .............. 370/465–7, 370/536, 542, 544; 710/62, 65–66, 71, 301–2, 710/304; 439/676, 638, 76.1, 945, 955, 66
See application file for complete search history.

(56) References Cited

U.S. PATENT DOCUMENTS

| 5,391,095 | A | 2/1995 | Born ............................. 439/676 |
| 7,335,033 | B1 * | 2/2008 | Edwards et al. ............. 439/76.1 |
| 7,506,093 | B2 * | 3/2009 | Bennett et al. ................ 710/302 |
| 7,512,726 | B2 * | 3/2009 | Han et al. ........................ 710/62 |
| 2004/0109465 | A1 * | 6/2004 | Kim et al. ..................... 370/419 |
| 2006/0216958 | A1 * | 9/2006 | Yee et al. ........................ 439/66 |
| 2008/0089693 | A1 * | 4/2008 | El-Ahmadi et al. .......... 398/135 |
| 2008/0205437 | A1 * | 8/2008 | Cole ............................. 370/464 |
| 2009/0125652 | A1 * | 5/2009 | Huff ............................... 710/71 |

* cited by examiner

*Primary Examiner* — Mark Rinehart
*Assistant Examiner* — Peter Cheng
(74) *Attorney, Agent, or Firm* — Brinks Hofer Gilson & Lione

(57) ABSTRACT

In one embodiment, a networking device may include a network port and be configured to receive a transceiver module card in the network port. The networking device may detect whether the transceiver module card is a single channel card or a multi-channel card, where the single channel card includes a single transceiver module and the multi-channel card includes multiple transceiver modules. The networking device may transmit data to the transceiver card either as a single channel de-multiplexed over multiple lanes or as multiple independent channels corresponding to the multiple lanes based on whether the transceiver module card is the single channel card or the multi-channel card. The networking device may transmit data over each of the lanes at one data rate regardless whether of the transceiver module card is the single channel card or the multi-channel card.

19 Claims, 3 Drawing Sheets

MULTI-CHANNEL TRANSCEIVER MODULE CARD

TECHNICAL FIELD

The present disclosure relates generally networking and, in particular, to transceivers.

BACKGROUND

Forty Gigabit Ethernet (GbE) is being standardized by the IEEE (Institute of Electrical and Electronics Engineers) as 802.3ba, code named XLAUI. Existing investment in equipment that support speeds lower than 40 gigabit per second poses a barrier to adoption of the 40 GbE standard.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DESCRIPTION OF EXAMPLE EMBODIMENTS

Overview

Figure 1:
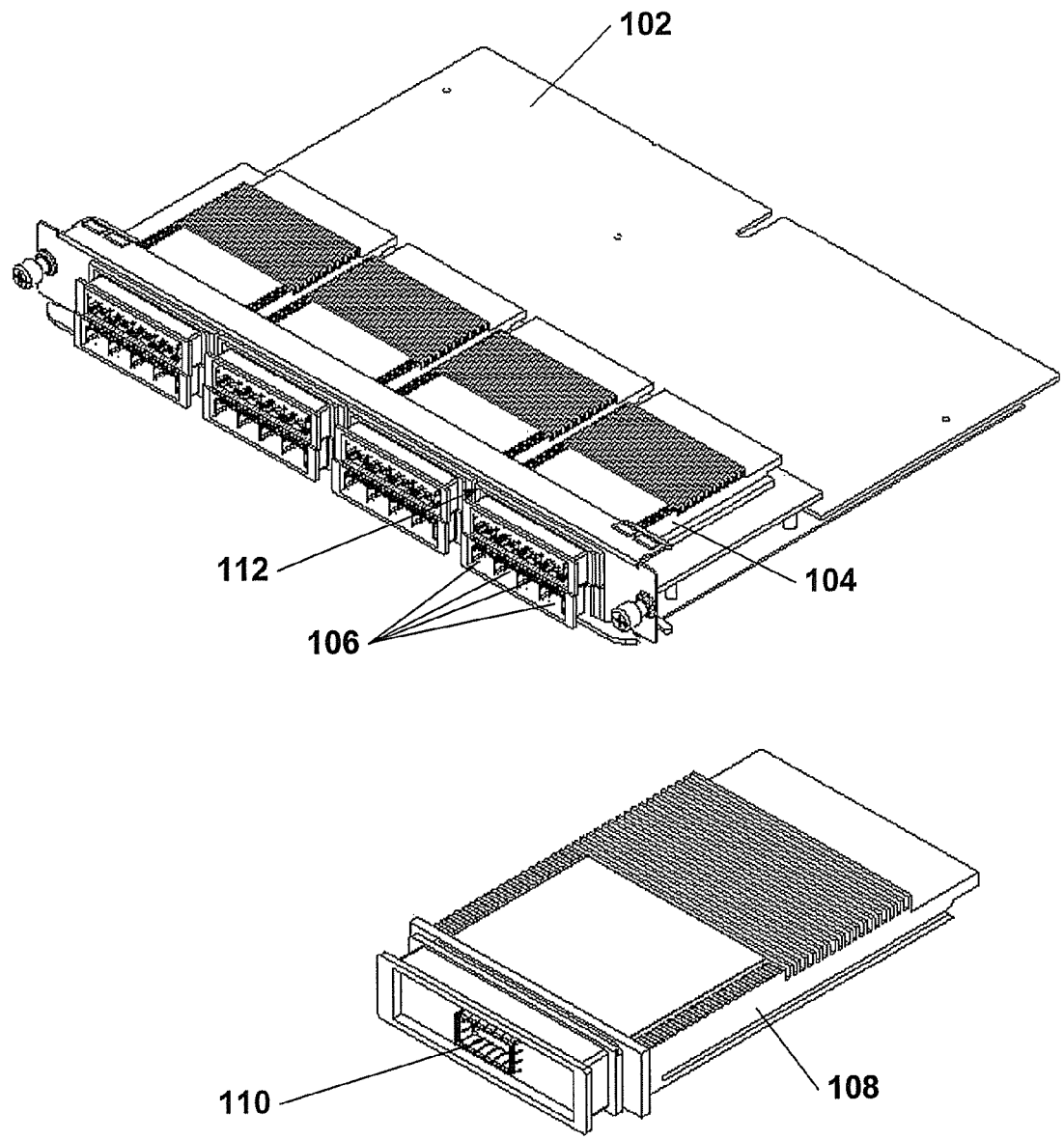
FIG. 1 illustrates an example of a line card that is configured to selectively receive, in the same network port, either a multi-channel transceiver module card having four 10 GbE interfaces or a single channel transceiver module card having a single 40 GbE interface.

By way of introduction, the example embodiments described below include an apparatus, a networking device, and a method.

According to a first aspect, the apparatus may include a connector, transceiver modules, and a signal converter. The connector may be coupled to multiple lanes in the apparatus, where the connector is configured to couple to a networking device when the apparatus is inserted into a network port of the networking device, and where each one of the multiple lanes transports a respective one of multiple independent channels of network traffic at one data rate. Each one of the transceiver modules may be coupled to a second set of lanes. The signal converter may be coupled to the first lanes and the second lanes, and wherein the signal converter is configured to convert between signals on the first lanes and the second lanes. Electrical characteristics of the first lanes conform to predetermined electrical characteristics included in a first chip-to-chip interface standard associated with a throughput data rate of a multiplicative product of the one data rate and the number of the independent channels, but the electrical characteristics of each one of the first lanes are incompatible with a second chip-to-chip interface standard associated with the throughput data rate of the one data rate.

In a second aspect, a networking device may include a network port. The networking device may be configured to receive a transceiver module card in the network port, where the network port includes a connector configured to electrically couple to the transceiver module card when received in the network port. The networking device may detect whether the transceiver module card is a single channel card or a multi-channel card. The single channel card includes a single transceiver module and the multi-channel card includes multiple transceiver modules. The networking device may transmit data to the connector either as a single channel de-multiplexed over a plurality of lanes or as multiple independent channels corresponding to the lanes based on whether the transceiver module card is the single channel card or the multi-channel card. The lanes may be coupled to the connector and the data may be transmitted over each one of the lanes at one data rate regardless whether of the transceiver module card is the single channel card or the multi-channel card.

In a third aspect, a method is provided. A transceiver module card may be received in a card slot of a network port that includes a connector configured to electrically couple to the transceiver module card. Data may be transmitted to the transceiver module card either as a single channel de-multiplexed over multiple lanes or as multiple independent channels corresponding to the multiple lanes based on whether the transceiver module card includes a single channel transceiver module for the single channel or a multiple transceiver modules for the independent channels, where the lanes are coupled to the connector. The data may be transmitted over each of the lanes at a common data rate regardless of whether the transceiver module card includes the single channel transceiver module corresponding to the single channel or the multiple transceiver modules corresponding to the independent channels.

The present invention is defined by the following claims, and nothing in this section should be taken as a limitation on those claims. Further aspects and advantages of the invention are discussed below in conjunction with the example embodiments.

Example Embodiments

FIG. 1 illustrates an example of a line card 102 that is configured to selectively receive either a multi-channel transceiver module card 104 having four 10 GbE interfaces 106 or a single channel transceiver module card 108 having a single 40 GbE interface 110 in the same network port 112. The multi-channel transceiver module card 104 may include a transceiver module for each respective one of the four 10 GbE interfaces 106. The single channel transceiver module card 104 may include a single transceiver module for the 40 GbE interface. The line card 102 may be inserted into a router (not shown) or a switch (not shown). The line card 102 may receive one of multiple transceiver module cards 104 and 108 in a corresponding one of multiple network ports. In the example illustrated in FIG. 1, the line card 102 receives eight transceiver module cards 104 and 108 in eight network ports. Any one of the four network ports may receive either type of transceiver module card. Thus, the same line card 102 may be used with the 40 GbE networking standard, the 10 GbE networking standard, or both, depending on the preference of the customer. In different examples, any number of transceiver module cards 104 and 108 may be inserted into a corresponding one of the network ports of the line card 102.

A transceiver module that supports a higher speed interface than another may be more significantly more expensive. Consequently, the multi-channel transceiver module card 104 that includes the four 10 gigabit per second transceiver modules for each respective one of the four 10 GbE interfaces 106 may be less expensive than the single channel transceiver module card 108 that includes the single transceiver module for the single 40 GbE interface 110. A customer may purchase the line card 102 with the network port 112 that supports 40 gigabit per second throughput, but purchase the multi-channel transceiver module card 104 that includes four 10 gigabit per second transceiver modules for each one of the four 10 GbE interfaces 106. The customer will get the full 40 gigabit per second throughput capability of the line card 102, but without having to immediately purchase the single channel transceiver module 108 with the 40 GbE interface 110. Later, the client may purchase the single channel transceiver module 108 with the 40 GbE interface 110 without having to buy a new line card to support 40 GbE.

A connector included in the network port 112 may conform to electrical characteristics set out in a chip-to-chip interface associated with the 40 GbE standard. The connector may be coupled to four lanes in the line card 102. Also in conformance with the chip-to-chip interface associated with the 40 GbE standard, the line card 102 may transmit and receive data as a single 40 GbE channel de-multiplexed over the four lanes when the single channel transceiver module card 108 is inserted into the network port 112. The line card 102 may transmit data over each one of the four lanes at 10 gigabits per second for a total throughput of 40 gigabit per seconds. By de-multiplexing the signal, the data rate transmitted and/or received over each of the lanes is less than the overall data rate of the single 40 gigabit bit per second channel. At such high data rates, de-multiplexing the single channel may lower the cost of implementation and time to market of the single channel transceiver module card 108 and of the line card 102. The single transceiver module on the single channel transceiver module card 108 may multiplex a signal received over the four lanes into a single signal transmitted over cabling coupled to the 40 GbE interface 110.

When either of the transceiver module cards 104 and 108 is inserted in the line card 102, the signals carried through the connector included in the network port 112 may conform to the electrical characteristics set out in the chip-to-chip interface associated with the 40 GbE standard. However, the data format of the signals transmitted and received by the transceiver module card at the connector may conform to a chip-to-chip interface associated with the 10 GbE standard when the multi-channel transceiver module card 104 is inserted into the network port 112. For example, the line card 102 may transmit and receive data as four independent channels over the four lanes when the multi-channel transceiver module card 104 is in the network port 112. Therefore, when the multi-channel transceiver module card 104 that includes the four 10 GbE interfaces 106 is in the network port 112, the signals carried through the connector may be incompatible with the electrical characteristics set out in the chip-to-chip interface associated with the 10 GbE standard and incompatible with the data format standard associated with the 40 GbE standard.

Figure 2:
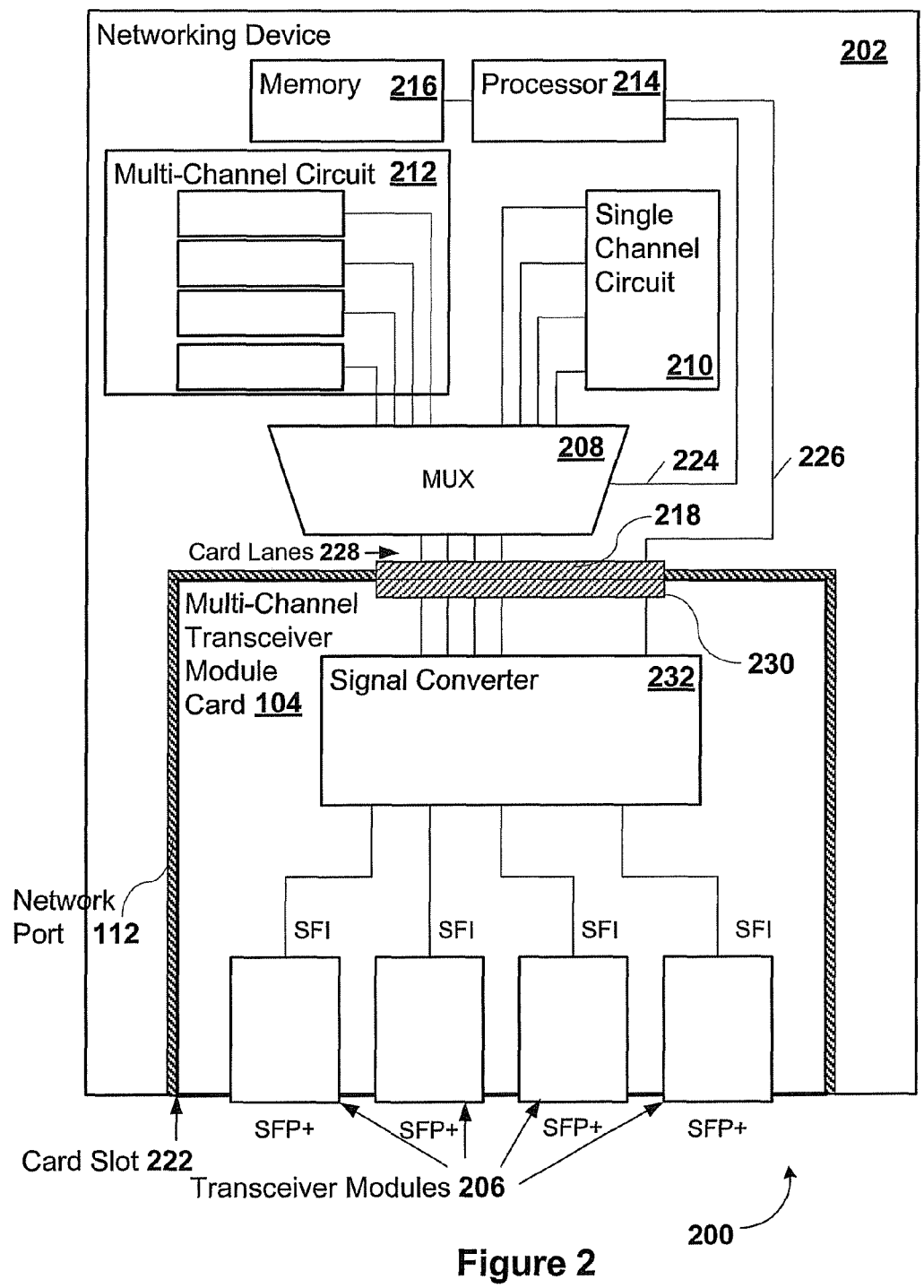
FIG. 2 illustrates one example of a system to selectively receive either a multi-channel transceiver module card or a single channel transceiver module card.

FIG. 2 illustrates one example of a system 200 to selectively receive either a multi-channel transceiver module card 104 or a single channel transceiver module card 108. The system 200 may include the multi-channel transceiver module card 104, a networking device 202, or both. The system 200 may include additional, different, or fewer components. For example, the system 200 may include the networking device 202 and a single channel transceiver module card 108.

The networking device 202 may be any device or combination of devices that transmits data from at least one physical network to another. Examples of the networking device 202 include a router, a switch, a line card, or any combination thereof.

The multi-channel transceiver module card 104 may be a device that includes one or more transceiver modules 206 and may be inserted into the network port 112 of the networking device 202. Each one of the transceiver modules 206 may be any device that converts serialized digital signals to and from signals in a single cabling, such as fiber optic cabling and copper wiring. Examples of a transceiver module include a SFP (small form-factor pluggable transceiver) module, a SFP+ module, and a 10 GBASE-T converter with an RJ45 interface.

The networking device 202 may include a multiplexer (MUX) 208, a single channel circuit 210, a multi-channel circuit 212, a processor 214, a memory 216, a connector 218, and a network port 112 configured to receive the multi-channel transceiver module card 104—or some other transceiver moduile card—in a card slot 222 of the network port 112. The networking device 202 may include additional, different, or fewer components. For example, the networking device 202 may not include the processor 214 and the memory 216.

The single channel circuit 210 may be any circuit that may transmit and/or receive data for a single channel that is de-multiplexed over multiple lanes. For example, the single channel circuit 210 may transmit and/or receive a 40 gigabit per second channel over four lanes. Each one of the four lanes may transport a portion of the single 40 gigabit per second channel at a data rate of 10 gigabits per second or other rate. In a different example, the single channel circuit 210 may transmit and/or receive data for the single channel that over a different number of lanes than four.

The multi-channel circuit 212 may be any circuit that may transmit and/or receive data for multiple channels, where each one of the channels is independent of the others and where each of the multiple channels is transmitted and/or received on a corresponding lane. For example, the multi-channel circuit 212 may transmit and/or receive four 10 GbE channels. In a different example, the multi-channel circuit 212 may transmit and/or receive four 1 GbE channels.

The lanes coupled to the single channel circuit 210 and the lanes coupled to the multi-channel circuit 212 may be coupled to the MUX 208. Card lanes 228 may be coupled to the MUX 208 and to the connector 218. A selection input 224 on the MUX 208 may control whether the lanes coupled to the single channel circuit 210 or the lanes coupled to the multi-channel circuit 212 are coupled to the card lanes 228.

The processor 214 may be in communication with the memory 216. The processor 214 may be a general processor, central processing unit, server, application specific integrated circuit (ASIC), digital signal processor, field programmable gate array (FPGA), digital circuit, analog circuit, or combinations thereof. The processor 214 may be one or more devices operable to execute computer executable instructions or computer code embodied in the memory 216 or in other memory to determine the type of the transceiver module card inserted in the card slot 222 and, depending on the type of the transceiver module card, to make a selection on the MUX 208 through the selection input 224. In one example, the processor 214 may also be in communication with the multi-channel transceiver module card 104 over a management interface 226. Examples of the management interface 226 include MDIO (management data input/output), I2C (inter-integrated circuit), and SPI (serial peripheral interface bus).

The memory 216 may be any now known, or later discovered, data storage device. The memory 216 may be a non-volatile and/or volatile memory, such as a random access memory (RAM), a read-only memory (ROM), an erasable programmable read-only memory (EPROM), or flash memory. The memory 216 may include an optical, magnetic (hard-drive) or any other form of data storage device.

The connector 218 may be any electrical connector that includes pins for the card lanes 228 and that couples with a connector 230 in the multi-channel transceiver module card 104 when the multi-channel transceiver module card 104 is inserted in the card slot 222. In one example, the connector 218 may also include one or more pins for other signals, such as pins for the management interface 226.

The multi-channel transceiver module card 104 may include the connector 230 that couples to the connector 218 in the networking device 202, a signal converter 232, and the transceiver modules 206. The multi-channel transceiver module card 104 may include additional, different, or more components.

Lanes in the multi-channel transceiver module card 104 may couple the signal converter 232 with the connector 230. Additionally, a lane for each corresponding one of the transceiver modules 206 may couple the corresponding one of transceiver modules 206 with the signal converter 232. The signal converter 232 may convert between signals received from and/or sent to the card lanes 228 and signals sent to and/or received from the transceiver modules 206. Examples of the signal converter 232 include an Electronic Dispersion Compensation (EDC) chip and a clock and data recovery (CDR) chip.

During operation of the system 200, a customer may insert the multi-channel transceiver card 104 into the card slot 222 of the network port 112. The customer may remove the multi-channel transceiver card 104 from the network port 112 and insert the single channel transceiver card 108 into the card slot 222. Consequently, either the multi-channel transceiver card 104 or the single channel transceiver card 108 may be in the card slot 222.

The processor 214 in the networking device 202 may determine what type of transceiver module card is inserted in the card slot 222. For example, the processor 214 may communicate with the multi-channel transceiver module card 104 via the management interface 226. The processor 214 may accordingly set the selection input 224 of the MUX 208 to couple the multi-channel circuit 212 lanes to the card lanes 228 if the transceiver module card is the multi-channel transceiver module card 104. Alternatively, if the processor determines that the transceiver module card is the single channel transceiver module card 108, then the processor 214 may accordingly set the selection input 224 to couple the single channel circuit 210 lanes to the card lanes 228. In an alternative example, the transceiver module card may directly set the selection input 224 to indicate the type of the transceiver module card. In yet another example, the processor 214 may set the selection input 224 to couple the single channel circuit 210 lanes to the card lanes 228 when the multi-channel transceiver module card 104 is in the card slot 222. In still another example, the processor 214 may set the selection input 224 to couple the multi-channel circuit 212 lanes to the card lanes 228 when the single channel transceiver module card 108 is in the card slot 222.

The signals received from and/or sent to the card lanes 228 may comply with a first chip-to-chip electrical interface standard associated with a first networking standard suitable to the single channel circuit 210. The first networking standard may be the networking standard associated with the throughput of the single channel circuit 210. For example, the first chip-to-chip electrical interface standard may be a 40 gigabit per second chip-to-chip electrical interface specification associated with the 40 GbE standard, such as XLAUI. The first chip-to-chip electrical interface standard may include predetermined electrical characteristics of the card lanes 228 and a data format of signals to be sent over the card lanes 228.

For example, the predetermined electrical characteristics of the card lanes 228 may include voltage ranges, lane-to-lane cross-talk, data rate, electrical impedance, and minimum signal-to-noise ratios. Consequently, the networking device 202 may receive any transceiver module card that includes a single channel transceiver compliant with the first chip-to-chip electrical interface standard.

However, the first chip-to-chip electrical interface standard may be different from a second chip-to-chip electrical interface standard associated with the throughput of each one of the lanes coupled to the multi-channel circuit 212. For example, the second chip-to-chip electrical interface standard may be XAUI associated with the 10 GbE standard. Both the predetermined electrical characteristics and the data format included in the first networking standard may differ from the predetermined electrical characteristics and the data format included in the second networking standard. For example, voltage ranges, minimum signal-to-noise ratios, and other characteristics may differ. For example, the XLAUI standard differs from the XAUI standard both in the predetermined electrical characteristics and in the data format or protocol of data transmission.

In order to compensate for the difference, the electrical characteristics of the lanes coupled to the multi-channel circuit 212 may conform to the predetermined electrical characteristics included in the first chip-to-chip electrical interface standard, while the data format of signals transmitted and/or received over the same lanes conforms to the second chip-to-chip electrical interface standard. For example, the data format of each of the lanes coupled to the multi-channel circuit 212 may conform to a chip-to-chip electrical interface associated with the 10 GbE standard, such as XFI. XFI is a high speed serial electrical interface for XFP according to INF-8007. Consequently, when the multi-channel transceiver module card 104 is in the network port 112, then the electrical characteristics of the card lanes 228 still conform to the first chip-to-chip electrical interface standard. However, the data format of signals transmitted and/or received over each one of the card lanes 228 may be compatible with the second chip-to-chip electrical interface standard instead of the first chip-to-chip electrical interface standard.

In the multi-channel transceiver module card 104, the signal converter 232 may convert between signals sent to and/or received from each of the card lanes 228 and signals sent to and/or received from the transceiver modules 206. For example, the signal converter 232 may alter voltage ranges, minimum signal-to-noise ratios, and other characteristics. In a 10 GbE example, the signals communicated between the signal converter 232 and one of the transceiver modules 206 may conform to the SFI standard. SFI is a high speed serial electrical interface for SFP+, according to SFF-8431. The signal converter 232 may perform any voltage adjustments, EDC, CDR, or any other conversions between the signals on the lanes to the transceiver modules 206 and signals on the card lanes 228.

Each of the channels handled by the multi-channel circuit 212 may operate with unsynchronized clocks even if the card lanes 228 are to be synchronized under the first chip-to-chip electrical interface standard. Therefore, nodes coupled to the transceiver modules 206 of the multi-channel transceiver module card 104 may not have to synchronize the different clocks among the nodes.

Figure 3:
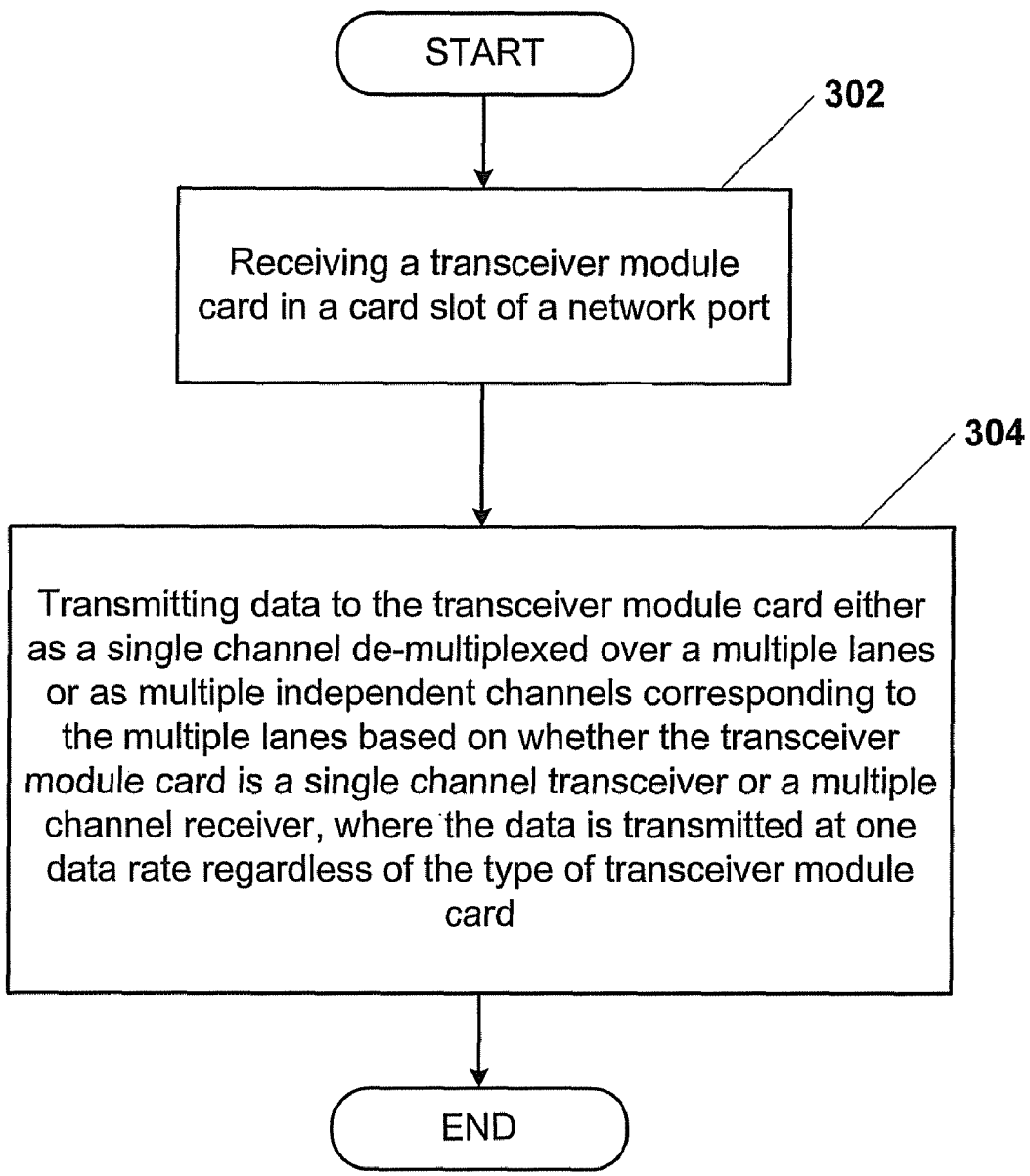
FIG. 3 illustrates one example of a method to selectively receive either a multi-channel transceiver module card or a single channel transceiver module card.

FIG. 3 illustrates one example of a method to selectively receive either the multi-channel transceiver module card 104 or the single channel transceiver module card 108. Additional, different, or fewer acts may be performed. The acts may be performed in a different order than illustrated in FIG. 3.

In act 302 of the embodiment illustrated in FIG. 3, the operation may begin by receiving one of the transceiver module cards 104 and 108 in the card slot 222 of the network port 112 where the network port 112 includes the connector 218 configured to electrically couple to the inserted transceiver module card.

The operation may continue in act 304 by transmitting data to the transceiver module card either as a single channel de-multiplexed over the card lanes or as multiple independent channels corresponding to the card lanes 228 based on whether the transceiver module card includes the single transceiver module for the single channel or two or more of the transceiver modules 206 for the independent channels. Transmitting the data may also include transmitting data over each of the card lanes 228 at one data rate regardless of whether the transceiver module card includes the single channel transceiver module corresponding to the single channel or the transceiver modules 206 corresponding to the independent channels.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A multi-channel transceiver module card comprising:
a connector coupled to a plurality of first lanes, wherein the connector is configured to couple to a networking device when the multi-channel transceiver module card is inserted into a network port of the networking device, and wherein each one of the first lanes transports a respective one of a plurality of independent channels of network traffic at one data rate, wherein electrical characteristics of the first lanes conform to predetermined electrical characteristics included in a first chip-to-chip interface standard for a first Ethernet standard for a throughput data rate of a multiplicative product of the one data rate and the number of the independent channels;
a plurality of transceiver modules, wherein each one of the transceiver modules is coupled to a respective one of a plurality of second lanes, wherein each one of the second lanes conforms to predetermined electrical characteristics of a second chip-to-chip interface standard for a second Ethernet standard for a throughput data rate of the one data rate, and wherein each one of the transceiver modules is configured to convert signals on the respective one of the second lanes to and from signals on a cabling; and
a signal converter, wherein the signal converter is coupled to the first lanes and the second lanes, and wherein the signal converter is configured to convert between signals on the first lanes coupled to the connector of the multi-channel transceiver module card and signals on the second lanes,
wherein the electrical characteristics of each one of the first lanes coupled to the connector of the multi-channel transceiver module card conform to the first chip-to-chip interface standard but not to the second chip-to-chip interface standard even though a data format of the signals on the first lanes conforms to the second chip-to-chip interface standard instead of to the first chip-to-chip interface standard.

2. The multi-channel transceiver module card of claim 1, wherein each one of the independent channels is asynchronous with respect to the other independent channels.

3. The multi-channel transceiver module card of claim 1, wherein data transported in conformance with the first chip-to-chip interface standard is transported as a single channel de-multiplexed over a plurality of lanes instead of as the independent channels.

4. The multi-channel transceiver module card apparatus of claim 1, wherein the multi-channel transceiver module card is sized to match a transceiver module card having a single transceiver module, the single transceiver module configured to communicate at the throughput data rate equal to the multiplicative product of the one data rate and the number of the independent channels.

5. The multi-channel transceiver module card of claim 1, wherein the signal converter is configured to perform an electronic dispersion compensation transformation on the signals passed between the first lanes and the second lanes.

6. The multi-channel transceiver module card of claim 1, wherein the signal converter is configured to perform clock and data recovery on the signals passed between the first lanes and the second lanes.

7. The multi-channel transceiver module card of claim 1, wherein the first chip-to-chip interface standard is XLAUI and the second chip-to-chip interface standard is XAUI.

8. A network device comprising:
a network port configured to receive a transceiver module card in the network port, wherein the network port includes a connector configured to electrically couple to the transceiver module card when received in the network port;

a processor configured to detect whether the transceiver module card is a single channel card or a multi-channel card, wherein the single channel card includes a single transceiver module and the multi-channel card includes a plurality of transceiver modules; and a multiplexer configured to transmit data to the connector either as a single channel de-multiplexed over a plurality of lanes or as a plurality of independent channels corresponding to the lanes based on whether the transceiver module card is the single channel card or the multi-channel card, wherein the lanes are coupled to the connector and wherein the data is transmitted over each of the lanes at a common data rate regardless of whether the transceiver module card is the single channel card or the multi-channel card, and wherein electrical characteristics of the lanes over which data is transmitted to the connector conform to predetermined electrical characteristics included in a first chip-to-chip interface standard for a first Ethernet standard for a throughput data rate of the single channel card regardless of whether the transceiver module card is the single channel card or the multi-channel card, but a data format of signals on the lanes conforms to a second chip-to-chip interface standard for a second Ethernet standard for a throughput data rate of the common data rate whenever the transceiver module card is the multi-channel card, and wherein the predetermined electrical characteristics of the first chip-to-chip interface standard are incompatible with the second chip-to-chip interface standard for the second Ethernet standard.

9. The network device of claim 8, further comprising a line card, wherein the line card includes the network port.

10. The network device of claim 8, further comprising a router, wherein the router includes the network port.

11. The network device of claim 8, wherein a throughput data rate of the single channel is 40 gigabits per second and the one data rate is 10 gigabits per second.

12. The network device of claim 8, wherein a throughput data rate of the single channel equals a multiplicative product of the one data rate and the number of the independent channels.

13. A method comprising:
receiving a transceiver module card in a card slot of a network port, wherein the network port includes a connector configured to electrically couple to the transceiver module card; and transmitting data to the transceiver module card over the connector of the network port either as a single channel de-multiplexed over a plurality of lanes or as a plurality of independent channels corresponding to the lanes based on whether the transceiver module card includes a single channel transceiver module for the single channel or a plurality of transceiver modules for the independent channels, wherein the lanes are coupled to the connector and wherein transmitting the data further includes transmitting data over each of the lanes at one data rate regardless of whether the transceiver module card includes the single channel transceiver module corresponding to the single channel or the transceiver modules corresponding to the independent channels, wherein transmitting the data to the transceiver module card includes transmitting a plurality of signals over the connector of the network port that are conformant to predetermined electrical characteristics of a first chip-to-chip interface standard instead of to predetermined electrical characteristics of a second chip-to-chip interface standard even though the data conforms to a data format of the second chip-to-chip interface, wherein the predetermined electrical characteristics of the first chip-to-chip interface standard are incompatible with the predetermined electrical characteristics of the second chip-to-chip interface standard, wherein the first chip-to-chip interface standard is for a first Ethernet standard for a throughput data rate of the single channel, and the second chip-to-chip interface standard is for a second Ethernet standard for the one data rate.

14. The method of claim 13, wherein each of the transceiver modules corresponding to the independent channels is configured to convert signals conforming to the second chip-to-chip interface Ethernet standard to signals on a respective cabling that conforms to the second Ethernet standard.

15. The method of claim 13, wherein a throughput data rate of the single channel is 40 gigabits per second and the one data rate is 10 gigabits per second.

16. The method of claim 13 further comprising receiving data either as the single channel de-multiplexed over the lanes or as the independent channels corresponding to the lanes based on whether the transceiver module card includes the single channel transceiver module corresponding to the single channel or the transceiver modules corresponding to the independent channels.

17. The method of claim 13 further comprising:
altering electrical characteristics of a plurality of signals received in the transceiver module card from the connector of the network port to form a plurality of converted signals; and transmitting the converted signals for each one of the independent channels to each respective one of the transceiver modules.

18. The method of claim 17 further comprising processing the converted signals using electronic dispersion compensation.

19. The method of claim 17 further comprising performing clock and data recovery on the converted signals.

* * * * *